Figure 1:
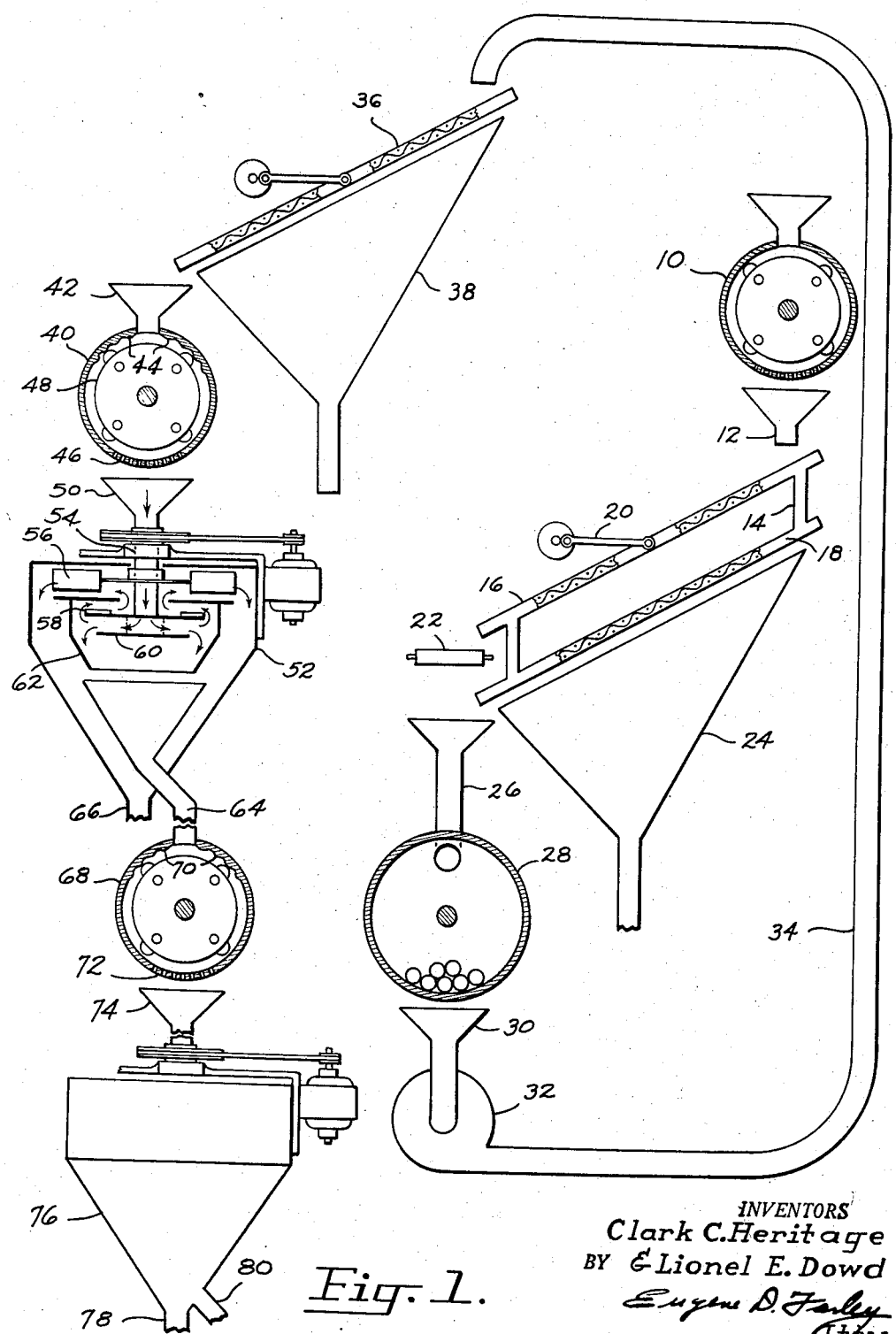

March 17, 1959 C. C. HERITAGE ET AL 2,877,953
GRANULAR SCLERENCHYMA AND THE METHOD OF ITS
PRODUCTION FROM DOUGLAS FIR BARK
Filed Sept. 29, 1953 2 Sheets-Sheet 1

INVENTORS
Clark C. Heritage
BY & Lionel E. Dowd
Eugene D. Farley
Atty.

INVENTORS
Clark C. Heritage
& Lionel E. Dowd

United States Patent Office 2,877,953
Patented Mar. 17, 1959

2,877,953

GRANULAR SCLERENCHYMA AND THE METHOD OF ITS PRODUCTION FROM DOUGLAS FIR BARK

Clark C. Heritage, Tacoma, and Lionel E. Dowd, Longview, Wash., assignors to Weyerhaeuser Timber Company, Tacoma, Wash., a corporation of Washington Application September 29, 1953, Serial No. 382,956

13 Claims. (Cl. 241—24)

This invention relates to granular sclerenchyma fiber derived from Douglas fir bark and to the method of its preparation from that source.

Douglas fir bark consists principally of cork, parenchyma tissue and sclerenchyma or bast fibers. The cork is so called because it is a spongy, resilient, low density material resembling the cork derived from cork oak bark in appearance and in many of its properties. The parenchyma tissue is a friable phloem tissue consisting principally of sieve tubes. The sclerenchyma, which in most other species comprises the stone cells, occurs in the Douglas fir in the form of hard, fusiform needles which are generally cylindrical in cross-section and less than about ¼ inch long. For the sake of simplicity, these are termed herein simply "Douglas fir bark fibers." The above three constituents of the bark are intimately commingled with each other in the bark structure and are present in varying proportions depending upon such factors as the age of the tree, climatic conditions and soil conditions. In general, the bark fibers are present in the proportion of between about 20% and about 50% by weight based on the dry weight of the bark. A typical composite sample of Douglas fir bark, for example, has the following composition: Cork, 24%; fiber, 31%; parenchyma, 45%.

Although a relatively new product on the market, Douglas fir bark fibers already have important applications. They are particularly useful in the formulation of thermosetting phenol-aldehyde molding compositions. In these the fibers may be incorporated in substantial proportions and they serve not only as a filler, materially reducing the cost of the compositions, but also as a component which imparts high flexural and tensile strength to the molded product.

To obtain the best results from the incorporation of Douglas fir bark fibers in phenol-aldehyde molding compositions, however, it is necessary that the fibers be relatively free from the cork and the parenchyma tissue together with which they occur in the bark. The presence of the latter two components is disadvantageous since they are aldehyde reactive. Accordingly, they necessitate the increase of the amount of relatively expensive phenol-aldehyde resin which must be employed in the formulation of the molding compositions or place stringent restrictions on the formulation of the resin used.

Furthermore, cork and parenchyma tissue are thermoplastic in character and thus reduce the thermosetting properties of the mixture. This leads to the formation of molded products which may have comparatively low softening temperatures. Still further, the presence of these materials in phenol-aldehyde molding compositions is disadvantageous in that they tend to stain and foul the molds employed in the pressing operation.

Moreover, a serious disadvantage attending the use of even pure Douglas fir bark fibers is the fact that they occur in the form of small, sharp penetrating needles. As a result, their use is attended by severe discomfort and even hazard on the part of the operating personnel. Unless remedied, this difficulty is so serious as to bar the application of the fibers to certain of the uses to which they otherwise are eminently well suited.

Still further, since the fibers are elongated, they align themselves with the flow lines during molding, and also form a hairy exterior on the molded product. These two factors obviously materially impair the surface appearance and tactile qualities of molded or consolidated articles made from mixtures including unmodified Douglas fir bark fibers.

Hence it is apparent that for many important uses it is desirable, and even necessary, that the bark fibers not only be substantially free from cork and parenchyma tissue, but also free of the penetrating properties which render their handling hazardous. This latter requirement is best achieved by reducing the sharp fusiform fibers to blunt granular particles.

The separation of a pure bark fiber fraction from Douglas fir bark and its conversion to granular form are not, however, procedures which are easy of accomplishment. This is due to several factors. As has been noted above, the fibers occur in the bark intimately mixed with the other bark constituents. They occur as individuals imbedded in a matrix of parenchyma tissue which, although friable in the mass, has the property of adhering very tightly as a thin coating on the surfaces of the fibers. Moreover, a certain proportion of the fibers is occluded with the cork platelets. Consequently the reduction of the bark to the form of small pieces to effect the release of occluded material is required as a preliminary step to its fractionation for the quantitative recovery of a fiber product.

However, a mere reduction in particle size does not permit a clean cut separation of the fibers from the other bark constituents. Rather, it results in the formation of a complex mixture comprising not only clean cork particles, unencrusted fibers and powdered parenchyma tissue, but also aggregates of cork with the other constituents of the bark, and sclerenchyma fibers encrusted with a tightly adhering coating of parenchyma tissue. This coating is clearly visible upon microscopic examination of the powdered bark, the fibers appearing as white or light colored translucent, elongated sharp ended bodies covered with a crust of dark colored, amorphous appearing parenchyma tissue.

Removal of the parenchyma sheaths from the fibers is difficult at best and is particularly difficult, if not impossible, by the usual abrading, scouring, or grinding methods if performed in the presence of the cork particles. These spongy, resilient bodies interfere with and markedly reduce the effectiveness of the abrading or grinding operation by serving as buffers which cushion the contact of the fibers with each other or the abrasive means and thereby prevent the removal of the parenchyma sheaths from the fibers.

Another difficulty inherent in any procedure for separating the fiber component from comminuted Douglas fir bark resides in the fact that the particles of cork and the fibers have overlapping sizes so that a single screening procedure is not successful in fractionating the particles quantitatively. Rather, a carefully coordinated series of operations for reducing the bark to the form of small pieces and then removing stepwise the various bark fractions with intermediate treating steps is required. Then after the fiber fraction has been obtained it is required for many purposes that it be reduced to the form of granules. This is a difficult undertaking since the fibers are hard, tough and very resistant to the ordinary grinding and abrading techniques.

The presently described procedure for the production of pure, granular sclerenchyma fiber from Douglas fir bark broadly comprises grinding bark having a moisture content of less than about 30% by weight to form a mixture of particles having maximum cross-sectional dimensions of less than about ½ inch. As has been noted above, this mixture is complex in character and comprises principally cork particles, aggregates of cork with the other constituents of the bark, parenchyma particles, and sclerenchyma fibers most of which are encrusted with tightly adherent sheaths of parenchyma tissue.

The foregoing mixture is processed for removal of at least a major proportion of its cork content. The substantially cork-free fraction then is abraded for removal of the sheaths encrusting the fibers. This forms a mixture consisting principally of bark fibers and powdered parenchyma tissue, together with a minor proportion of cork particles. The mixture is entrained in a gaseous stream, preferably an air stream, and fractionated in an air separator, which, taking advantage of the higher density of the fibers and the higher air resistance of the parenchyma and cork effectuates a relatively complete separation of the fibers from the mixture. These are collected as a separate fraction and broken up to form a granular fiber product which is free from sharp, penetrating particles and consequently handleable with comfort and safety.

As has been indicatesd above, the method of this invention is applicable particularly to the bark of the Douglas fir since in this species the sclerenchyma tissue is found in the form of the needle shaped fibers which have been described. In carrying it out, the moisture content of the bark first is adjusted to a value of less than about 30% by weight, the preferred range being between about 5% and about 15% by weight, with or without a preliminary comminution of the bark. Such an adjustment makes possible an effective grinding operation and subsequent separation of the fibers from the remainder of the bark. It may be accomplished in any suitable manner, as by means of ovens, dry kilns, or by air drying methods.

Figure 2:
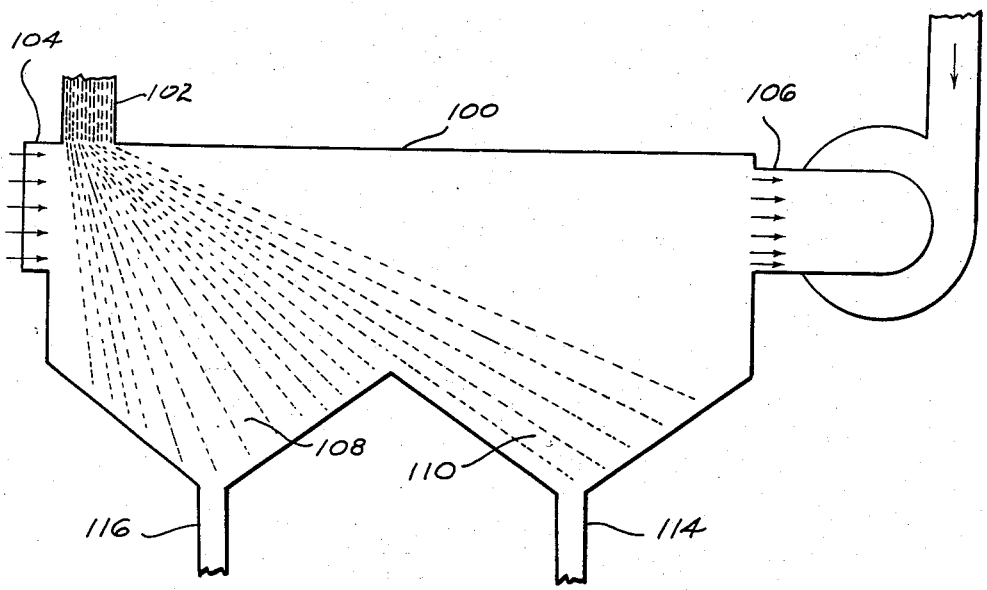

Referring now to the drawings wherein:

Figure 1 is a flow plan illustrating diagrammatically the operations whereby granular sclerenchyma fiber may be prepared from Douglas fir bark; and Figure 2 is a schematic view in side elevation of an alternate type of separator which may be employed in the operations illustrated in Figure 1.

The dried bark is reduced in size in a suitable mill which may be a ballmill, a rodmill, a hammermill, a Kollergang, etc. Preferably, however, the bark is reduced in a hammermill such as is illustrated at 10 in the drawings. The apparatus is fitted in the usual manner with a screen dimensioned to pass particles having a maximum dimension of less than about ½ inch, preferably less than about ¼ inch. It causes the reduction to the form of powder of most of the friable parenchyma tissue, the release of a substantial proportion of the cork in the form of cork platelets and of small aggregates of cork with the other constituents of the bark, and the liberation of a substantial proportion of the sclerenchyma fibers as individual fibers, most of which are encrusted with tightly adherent coatings of parenchyma tissue.

The ground product is collected in any suitable type of receiver, as for example, in hopper 12. It then is passed to means for separating a major proportion of the bark from the other constituents of the mixture. As has been noted above, this is in order to enable abrading the fibers for the removal of the encrusting parenchyma sheaths, an operation which is impossible or at least very difficult as long as the mixture contains a large amount of cork.

In the form illustrated in Figure 1, the means employed for the selective separation of the cork comprises a system of superimposed vibrating foraminious members or screens indicated generally at 14. The upper screen 16 has a mesh opening width of between about 0.01 and about 0.05 inch preferably between about 0.02 and 0.03 inch while the lower screen 18 has a mesh opening width of between about 0.006 inch and about 0.012 inch preferably between about 0.008 and 0.009 inch. The two screens are mounted in suitable guides, not illustrated, and vibrated by means of crank 20.

The openings of screen 16 are dimensioned to retain the cork particles and the relatively large aggregates of cork with the other cork constituents. These gravitate downwardly along the screen and are collected as a separate fraction on conveyor belt 22.

The powdered parenchyma tissue and the sclerenchyma fibers together with a relatively minor proportion of cork particles and cork-containing aggregates pass through screen 16 and fall on screen 18. The openings of this screen are dimensioned to pass principally the powdered parenchyma tissue which is collected as a separate fraction in hopper 24. The fibers, together with a small proportion of cork particles and cork aggregates, pass downwardly along screen 18 and are collected as a third fraction which then is subjected to further processing for removal of the parenchyma sheaths from the fibers.

As a step preliminary to such removal, the fiber fraction may be subjected to a second milling operation having for its purpose the separation of a further quantity of the powdered parenchyma tissue and the smaller cork particles. Thus it may be directed via conduit 26 into a ballmill 28 or similar mill where it is further abraded under conditions such that a minimum of particle reduction is achieved. The product then is collected in a hopper 30 and conveyed, gravitationally, or by means of a blower system including fan 32 and conduit 34, to a foraminous member which in the illustrated form comprises the vibrating screen 36.

Screen 36 has a mesh opening size of between about 0.006 inch and about 0.012 inch, preferably between about 0.008 and 0.009 inch, which passes the powdered parenchyma tissue and some of the smaller cork particles. These are collected as a separate fraction in hopper 38. The fraction containing principally the bark fibers, still encrusted with their parenchyma sheaths, but relatively free from cork and loose parenchyma, passes from the top of screen 36 into abrading or grinding means selected to scour off the parenchyma sheaths without simultaneously pulverizing the bark fibers.

The abrading apparatus employed preferably comprises the modified hammermill 40. This device is fed through hopper 42 and is provided with a breaker plate 44 and a screen 46 having a mesh opening size of between about ¼ inch and about ½ inch. The hammer member 48 is dimensioned to rub and abrade the charge against the breaker plate 44, the reduced material then passing through screen 46. The mill accomplishes the removal of the parenchyma tissue from the fiber needles so that as a product there are obtained the parenchyma-free needles, the powdered parenchyma tissue and a minor quantity of small cork particles.

As has already been noted, fractionation of the foregoing mixture to isolate the fibers as a separate and distinct fraction is difficult because of the overlapping sizes and weights of the component particles. Accordingly, a simple screening procedure may not be employed such as is used conventionally in the separation of many solid mixtures. It now has been discovered, however, that an effective separation of the bark fibers may be accomplished by taking advantage of the different air resistance properties of the bark components.

Accordingly, the bark fibers may be separated from the comminuted mixture in which they are contained by entraining the mixture in an air or other gaseous stream and centrifuging or winnowing it for separating the fibers as a separate fraction. In a preferred procedure the mixture passed by hammermill 40 is collected in a hopper 50, and directed into a type of centrifuge 52 commonly known as a whizzer or Raymond air separator. This device separates solid particles by subjecting them to centrifugal force combined with a self-generated updraft. Its construction and mode of operation are described in detail in U. S. Patent Re. 20,543 to Crites.

As is illustrated schematically in Figure 1, the comminuted fiber fraction is introduced into the separator through the bore of rotatably mounted, hollow shaft 54. This shaft is motor driven and carries a fan 56, a bladed wheel 58 and a distributor plate 60, the two latter being housed within an inner shell 62.

Fan 56, bladed wheel 58 and distributing plate 60 are rigid to shaft 54 and rotate therewith. During rotation of the fan, air currents are set up along the path illustrated by the arrows. Accordingly, the fiber fraction introduced through the bore of the shaft first strikes distributor plate 60 and then is scattered and blown upwardly through the blades of wheel 58. The blades exert a centrifugal action upon the particles, casting them outwardly in proportion to their weight and air resistance. The heavier fiber particles are thrown against the inside surface of shell 62 and pass out of the apparatus via conduit 64. The lighter particles, however, are not so subject to centrifugal action and are carried by the air currents into the outer chamber where they settle to the bottom of the apparatus. They are educted therefrom via conduit 66, where they may be collected as a separate fraction. The fiber fraction thus obtained represents about 20% of the original weight of the dry bark, which in turn contained about 25% fiber. It is obtained in the form of small translucent needles, pointed at both ends and on the average about ⅛ inch long. The fraction analyzes about 90% pure fiber and is applicable to some of the uses to which pure Douglas fir fiber may be put.

As has been noted above, however, for many of its uses it is imperative that Douglas fir bark fibers be in handleable form, free from the sharp spurs which are the cause of hazard and severe discomfort to those handling the material. Transformation of the fibers to such a form is, however, a difficult matter. Not only are the fibers of substantial density, but they are extremely resistant to grinding and abrading procedures.

We have discovered that Douglas fir fibers, when substantially free from cork, may be fractured transversely and reduced to granular forms which are free from penetrating spurs through the use of a modified hammermill or micropulverizer 68. This device is fitted with a breaker plate 70 and a foraminous plate 72. The fibers in needle form are fed into the mill and reduced by the hammers therein to the form of granules which are passed out of the machine via foraminous plate 72.

The granular product is mixed with a minor proportion, on a weight basis, of fluffy pulverulent parenchyma tissue. Since for some applications it may be desirable to secure the fiber granules free from this material, the product of micropulverizer 68 may be passed into a hopper 74 from which it is introduced into an air separator indicated generally at 76. This may operate on a winnowing or centrifugal principle as has been discussed above in detail in connection with the air separator 52. The light fraction obtained from separator 76 through conduit 78 comprises the powdered parenchyma tissue. The heavy fraction obtained through conduit 80 comprises the desired granular sclerenchyma fiber. It is composed of granules having particle sizes of less than 100 mesh, at least 50% having particle sizes of less than 200 mesh.

The granular product obtained in this manner represents about 12% of the original weight of the dry bark. As observed microscopically, it consists of irregular, translucent granules having the general form and appearance of rock salt. It is entirely free from the sharp penetrating spurs which characterize the fibers in their native state. Accordingly, it may be handled with comfort and without hazard. Furthermore, it still retains its desirable properties of imparting to thermosetting phenol-aldehyde molding compositions, in which it is contained, properties of high strength, good flow, and improved appearance.

An alternative air separator for separating the bark fibers from the mixture emanating from mill 40 of Figure 1 is illustrated in Figure 2. This comprises a winnower 100 which, like the air separator 52 of Figure 1, takes advantage of the differential densities between the fibers, the parenchyma powder and the cork particles.

In this device, the finely divided feed material introduced in dispersed form through conduit 102 is entrained in an air stream entering through port 104 and exhausted through port 106. At the bottom of the winnowing chamber there are at least two hoppers, one of these being indicated at 108 and the other at 110.

The solid material entrained in the air stream will fall downwardly within the apparatus in proportion to its density, the heavier fraction comprising the bark fibers collecting in hopper 108 and the lighter fraction comprising principally the powdered parenchyma collecting in hopper 110. The powdered parenchyma fraction then may be withdrawn from the device through conduit 114 and the fiber fraction through conduit 116. The latter fraction thus is obtained as a relatively pure product such as is obtained from the air separator 52 of Figure 1.

*Example*

The method of the present invention is illustrated by the following example, wherein parts are expressed as parts by weight.

1000 pounds (dry bark basis) of Douglas fir bark having a moisture content of about 10% was milled in a hammermill provided with an 8 mesh screen. The material passing the screen was placed on a double deck vibrating screen, the top screen of which had a mesh opening size of 0.02 inch and the bottom of 0.008 inch.

The cork fraction retained on the top screen was collected separately. It weighed 372 pounds. The parenchyma powder fraction passed on both screens was collected as a separate fraction. It weighed 217 pounds. The fiber fraction retained on the second screen weighed 411 pounds. It was passed to a ballmill and reduced to such particle size that less than 0.5% was retained on a 28-mesh standard Tyler screen, after which the ground product was screened on a vibrating screen having mesh openings of 0.008 inch. The material passing the screen weighed 179 pounds and was not further processed. The fiber fraction retained on the screen weighed 232 pounds and was passed into a modified hammermill fitted with a breaker plate at the top and a ⅜ inch mesh opening screen at the bottom.

The material passing the screen of the hammermill then was introduced into a Raymond air separator and divided into two fractions. The light fraction weighed 66 pounds and consisted of both cork particles and powdered parenchyma. The heavy fraction weighed 166 pounds and consisted of pure bark fibers analyzing about 90% fiber. These were substantially free from encrusting parenchyma tissue.

Next the pure fibers were processed for reducing them to a granular form in which they were free from sharp, penetrating needles or spurs. This was accomplished by introducing them into a modified hammermill equipped with a breaker plate at the top and 0.02 inch screen at the bottom. The milled product consisted of fiber granules intermixed with a small amount of light, amorphous parenchyma tissue. It was introduced into a Raymond air separator from which was obtained a light fraction consisting of parenchyma powder and a heavy fraction consisting of fiber granules.

The latter was easily handleable, translucent, and of a light brown color. Upon microscopic examination, they resembled crystalline materials such as rock-salt in physical form. When used in amounts of the order of up to 80% by weight in molding compositions together with thermosetting phenol-aldehyde resins, the resulting composition had satisfactory flow properties upon molding and the molded product had good surface qualities and superior strength.

Thus it will be apparent that by the present invention we have provided a method of separating the fiber from the bark of the Douglas fir in substantially pure form, free from cork and parenchyma constituents of the bark. The fiber as obtained is well suited for use in thermosetting phenol-aldehyde molding compositions and other applications where a pure bark fiber product is needed. Moreover, it provides for the first time a lignocellulose product which is pourable, non-hygroscopic, of high density, easily handleable and hence useful in a wide variety of applications. This product is obtained, furthermore, by an economical method using readily available apparatus designed for installation as an adjunct of mills processing Douglas fir logs. Accordingly it makes possible the further commercial utilization of a hitherto almost valueless product, i. e. Douglas fir bark.

It is to be understood that the form of our invention herewith shown and described, is to be taken as a preferred example of the same, and that various changes in the shape, size and arrangement of parts may be resorted to, without departing from the spirit of the invention, or the scope of the subjoined claims.

Having thus described the invention, we claim:

1. The method of separating from Douglas fir bark granular sclerenchyma which is substantially free from the other bark constitutents, which method comprises reducing bark having a moisture content of less than about 30% by weight to a mixture of particles having maximum cross-sectional dimensions of less than about ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, abrading the resulting fiber-rich mixture for removing the parenchyma encrustations from the fibers, entraining the abraded fiber-rich mixture in a gaseous stream, selectively separating the sclerenchyma fibers from the entrained mixture, and transversely breaking the sclerenchyma fibers to form granular sclerenchyma substantially free from penetrating spurs and having a particle size of less than about 100 mesh.

2. The method of claim 1 wherein the cork particles and cork-containing aggregates are separated from the mixture by selective screening of the same.

3. The method of claim 1 wherein the cork particles and cork-containing aggregates are removed from the mixture by screening the mixture through a double screen, the upper screen having a mesh opening size of between about 0.01 inch and about 0.05 inch and the lower screen having a mesh opening size of between about 0.006 inch and about 0.012 inch.

4. The method of claim 1 wherein the cork particles and cork-containing aggregates are removed from the mixture by screening the mixture through a double screen, the upper screen having a mesh opening size of between about 0.02 inch and about 0.03 inch and the lower screen having a mesh opening size of between about 0.008 inch and about 0.009 inch.

5. The method of claim 1 wherein the sclerenchyma fibers are separated from the entrained mixture by winnowing the same.

6. The method of claim 1 wherein the sclerenchyma fibers are separated from the entrained mixture by centrifuging the same.

7. The method of claim 1 wherein the cork particles and cork-containing aggregates are separated from the mixture by selective screening of the same and the sclerenchyma fibers are separated from the mixture from which the cork particles and cork-containing aggregates have been removed by entraining it in a gaseous stream and centrifuging the resulting gaseous suspension of solid particles.

8. The method of separating from Douglas fir bark granular sclerenchyma which is substantially free from the other constitutents of the bark which comprises reducing bark having a moisture content of less than 30% by weight to a mixture of particles having maximum cross-sectional dimensions of less than about ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture by screening the same through a double screen, the upper screen having a mesh opening size of between 0.01 inch and 0.05 inch and the lower screen having a mesh opening size of between 0.006 inch and 0.012 inch, a substantial proportion of the cork and cork-containing aggregates being retained on the top screen, the fibers and some cork-containing aggregates being retained on the second screen, and the parenchyma particles passing through the second screen; abrading the fiber-rich mixture retained on the second screen for removing the parenchyma encrustations from the fibers, winnowing the abraded fiber-rich mixture for separating the sclerenchyma fibers therefrom, and transversely breaking the sclerenchyma fibers to form granular sclerenchyma substantially free from penetrating spurs and having a particle size of less than about 100 mesh.

9. The method of separating from Douglas fir bark granular sclerenchyma which is substantially free from the other constituents of the bark which comprises reducing bark having a moisture content of less than 30% by weight to a mixture of particles having maximum cross-sectional dimensions of less than ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, milling the resulting fiber-rich mixture for separating further the parenchyma tissue and the cork particles, screening the milled product for separation of a concentrated fiber fraction (retained) from further quantities of powdered parenchyma and small cork particles (passed), abrading the concentrated fiber fraction for removing the parenchyma encrustations from the fibers, entraining the abraded material in a gaseous stream, selectively separating the sclerenchyma fibers therefrom, and transversely breaking the sclerenchyma fibers to form granular sclerenchyma substantially free from penetrating spurs and having a particle size of less than about 100 mesh.

10. The method of separating from Douglas fir bark granular sclerenchyma which is substantially free from the other constituents of the bark which comprises reducing bark having a moisture content of less than 30% by weight to a mixture of particles having maximum cross-sectional dimensions of less than ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, milling the resulting fiber-rich mixture for separating further the parenchyma tissue and the cork particles, screening the milled product on a screen having a mesh opening size of between 0.006 and 0.012 inch for separation of a concentrated fiber fraction (retained) from further quantities of powdered parenchyma and small cork particles (passed), abrading the concentrated fiber fraction for removing the parenchyma encrustations from the fibers, entraining the abraded material in a gaseous stream, selectively separating the sclerenchyma fibers therefrom, and transversely breaking the sclerenchyma fibers to form granular sclerenchyma substantially free from penetrating spurs and having a particle size of less than about 100 mesh.

11. The method of separating from Douglas fir bark granular sclerenchyma which is substantially free from the other constituents of the bark, which method comprises comminuting the bark and concentrating it for separation of a fiber-rich fraction thereof, adjusting the moisture content of the fiber-rich fraction to less than 30% by weight, grinding said fraction at said moisture content to provide a mixture of particles having maximum cross-sectional dimensions of less than ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, abrading the resulting fiber-rich mixture for removing the parenchyma encrustations from the fibers, entraining the abraded fibre-rich mixture in a gaseous stream, selectively separating the sclerenchyma fibers from the entrained mixture, and transversely breaking the sclerenchyma fibers to form granular sclerenchyma substantially free from penetrating spurs and having a particle size of less than about 100 mesh.

12. The method of separating from Douglas fir bark granular sclerenchyma which is substantially free from the other bark constituents, which method comprises reducing bark having a moisture content of less than about 30% by weight to a mixture of particles having maximum cross-sectional dimensions of less than about ½ inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, abrading the resulting fiber-rich mixture for removing the parenchyma encrustations from the fibers, entraining the abraded fiber-rich mixture in a gaseous stream, selectively separating the sclerenchyma fibers from the entrained mixture, grinding the separated sclerenchyma product to form a mixture comprising powdered parenchyma tissue and granular sclerenchyma substantially free from penetrating spurs and having a particle size of less than about 100 mesh, entraining the ground product in a gaseous stream, and collecting therefrom the parenchyma powder and the granular sclerenchyma as separate fractions.

13. The method of separating from Douglas fir bark granular sclerenchyma which is substantially free from other bark constituents, which method comprises reducing the bark to a mixture of particles having maximum cross-sectional dimensions of less than about ½", the mixture comprising cork particles, cork-containing aggregates, parenchyma particles, and sclerenchyma fibers encrusted with tightly adherent sheaths of parenchyma tissue, selectively removing a substantial portion of the cork particles and cork-containing aggregates from the mixture, abrading the resulting fiber-rich mixture for removing the parenchyma encrustations from the fibers, entraining the abraded fiber-rich mixture in a gaseous stream, selectively separating the sclerenchyma fibers from the entrained mixture, and transversely breaking the sclerenchyma fibers to form granular sclerenchyma substantially free from penetrating spurs and having a particle size of less than about 100-mesh, the mixture containing the original bark component being dried to adjust the moisture content to less than 30% by weight prior to separation of the cork particles and cork-containing aggregates from the mixture.

References Cited in the file of this patent

UNITED STATES PATENTS

| | | |
|---|---|---|
| 1,455,762 | Howard | May 15, 1923 |
| 2,437,672 | Anway | Mar. 16, 1948 |
| 2,446,551 | Pauley | Aug. 10, 1948 |
| 2,627,375 | Grondal et al. | Feb. 3, 1953 |